INVENTOR.
EARLE C. KING
BY
Brown, Critchlow, Flick & Peckham
ATTORNEYS.

March 2, 1971  E. C. KING  3,566,684
ELECTRODES FOR MOLTEN METAL ELECTROMAGNETIC
FLOWMETERS AND THE LIKE
Filed July 17, 1968  2 Sheets-Sheet 2
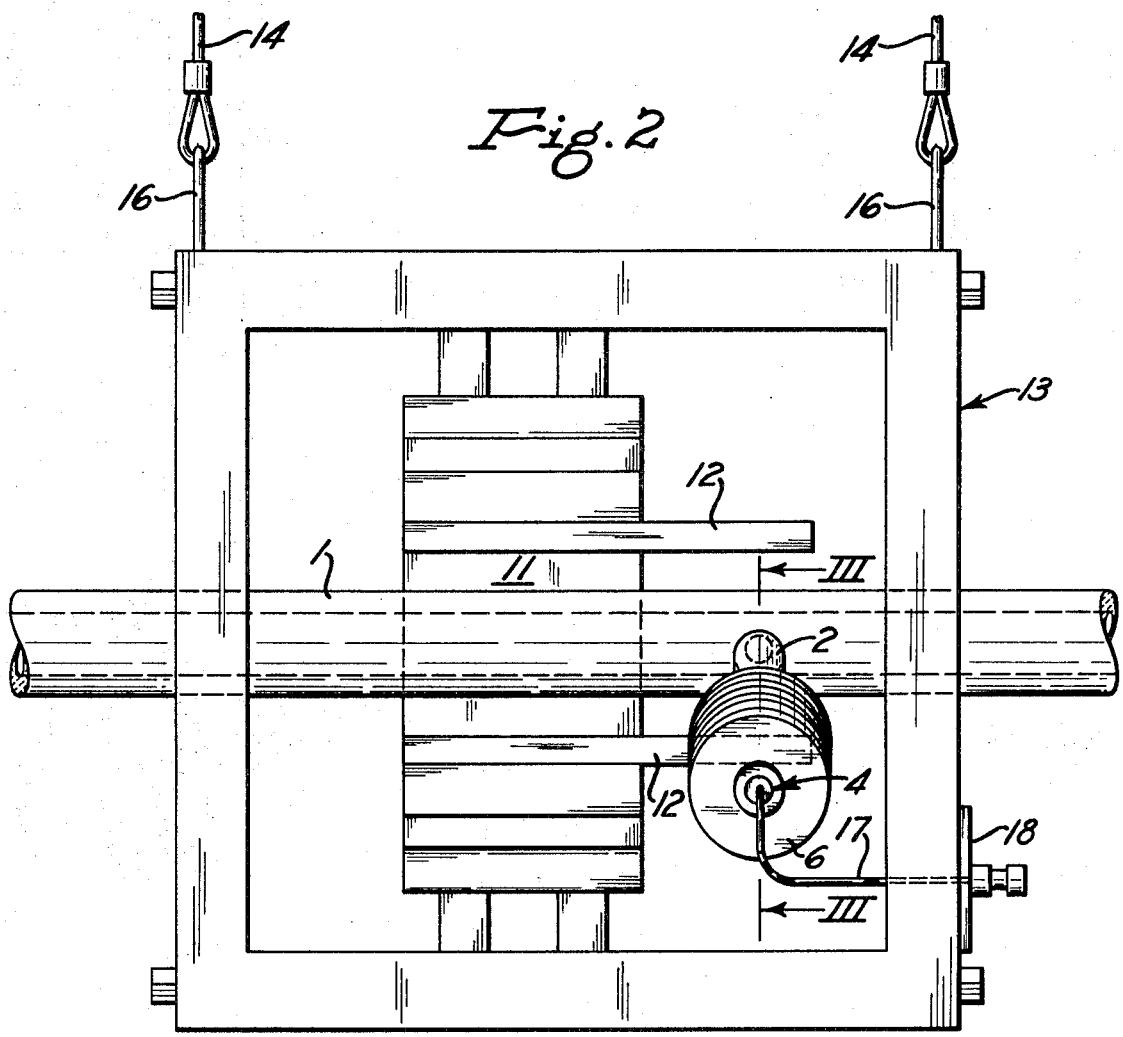
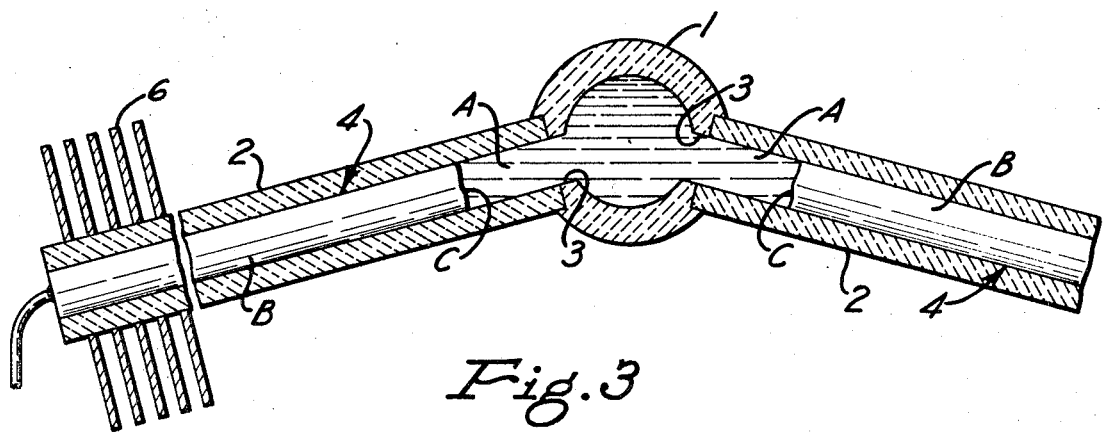
INVENTOR.
EARLE C. KING
BY
Brown, Critchlow, Flick & Peckham
ATTORNEYS.

United States Patent Office 3,566,684
Patented Mar. 2, 1971

3,566,684
ELECTRODES FOR MOLTEN METAL ELECTRO-
MAGNETIC FLOWMETERS AND THE LIKE
Earle C. King, Evans City, Pa., assignor to Mine Safety
Appliances Company, Pittsburgh, Pa.
Filed July 17, 1968, Ser. No. 745,545
Int. Cl. G01f 1/00
U.S. Cl. 73—194
10 Claims

ABSTRACT OF THE DISCLOSURE

This invention relates to means for making electrical contact with a stream of molten metal flowing in an electrically non-conductive flow tube. Such means include a branch tube of electrically non-conductive material communicating with the interior of the flow tube and a metal electrode disposed in the branch tube. This electrode is characterized by being in part liquid and in part solid, the portion thereof adjacent the flow tube and in electrical contact with the stream of molten metal therein being in the molten state and the portion thereof remote from the flow tube being in the solid state, the branch tube being sealed by the solidified molten metal of the electrode. The invention is particularly useful in connection with molten metal electromagnetic flowmeters by providing electrodes that will conduct the electrical signal generated by molten metal flowing through an electrically non-conductive flow tube subjected to an externally applied magnetic field.

---

Electromagnetic flowmeters for conductive fluids are based on the principle that an electrical conductor moving in a magnetic field generates a potential at right angles both to the direction of the magnetic flux and to the direction of the moving conductor. In this respect, a conductive liquid flowing in a conduit acts as a moving solid conductor; and the potential generated is directly proportional to the fluid velocity even though some of the generated potential is shorted out by the slower moving fluid next to the wall of the conduit and, where a metal wall is used, by the wall itself.

When the flowing liquid is a molten metal at an elevated temperature, for example, molten steel at a temperature of around 2800° F. circulating in a degassing process unit, the problems associated with the flowmeter design are complicated by the necessity of making electrical contact with the flowing stream of metal, the large size of the stream, the temperatures involved, the use of a ceramic conduit, and the change in the flowstream cross section as the inner surface of the conduit erodes with use. The present invention is directed to a solution of this specific problem, as well as the broader problem of making electrical contact through an electrically non-conductive wall with a molten metal on the other side of the wall.

A preferred embodiment of the invention is described herein, in connection with the attached drawings, in which FIG. 1 is a front elevation of the flowmeter of this invention;

FIG. 2 is a side elevation of the apparatus in FIG. 1; and

FIG. 3 is an enlarged, fragmentary, cross section of a portion of the flow tube and of the branch tubes connected thereto containing the electrodes, along the line III–III of FIG. 2.

Figure 1:
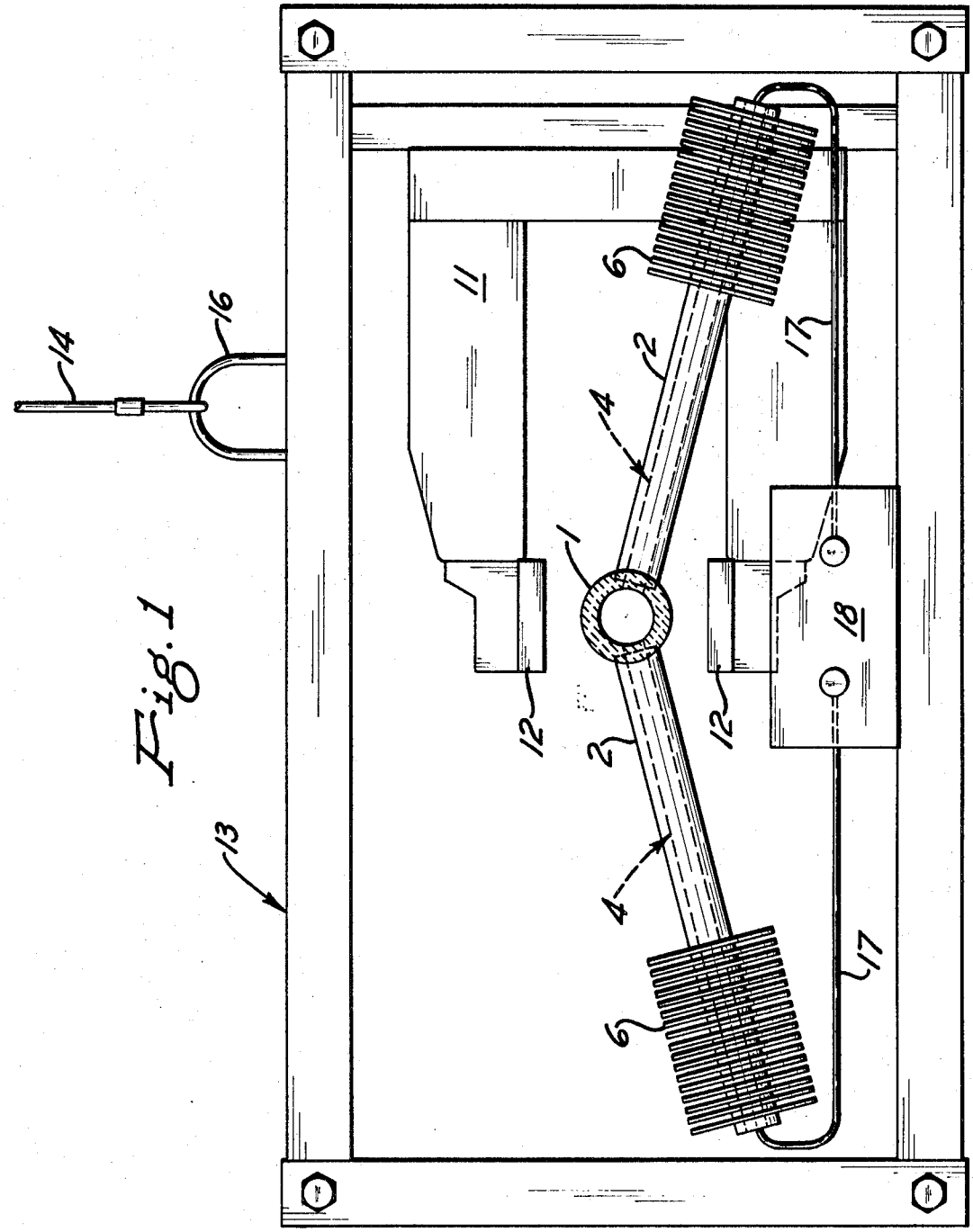

Referring to the drawings, the numeral 1 indicates a portion of a flow tube or conduit of electrically non-conductive refractory material, through which is flowing a stream of molten metal, for example, molten steel at a temperature of around 2800° F. This tube may be a leg of a Ruhrstahl-Hereaus circulating flow degassing process unit, a conduit for continuous casting of steel, or the like. To provide additional strength, the flow tube may be encased by a sheathing (not shown) of stainless steel or similar non-magnetic material that will prevent distortion of the magnetic field in the region where flow measurements are taken. In a typical degassing unit of the type described, the flow tube 1 may have an initial internal diameter of around 10 or 12 inches and the molten steel therein may be flowing at the rate of about 40,000 pounds per minute, i.e., at approximately 700 gallons per minute. The wall of the flow tube is preferably made thick enough to accommodate a loss of wall material through erosion that will increase the internal diameter by nearly 50 percent.

In the section of the flow tube where flow measurements are to be taken, two branch tubes 2 of the same material as the flow tube are inset into the wall of the flow tube and communicate with the interior of that tube through a bore 3 of the same diameter as the inside diameter of the branch tubes. These branch tubes may also be reinforced, if desired, by external sheathing (not shown) of non-magnetic stainless steel. The inner ends of the bores 3 are substantially diametrically opposed to each other, and the axis of each branch tube is preferably inclined at an angle of about 15° below the horizontal, so that the branch tubes slope upwards from their outer ends to prevent gases from collecting in those tubes and causing a break in the electrical circuitry. Disposed inside each branch tube is a metal electrode 4. This may be conveniently formed in several ways. As one example, the molten metal inside the flow tube is permitted to flow through the branch tubes until the metal reaches a point where it solidifies across the branch tube and acts as a plug to prevent the escape of the molten metal. The branch tubes are long enough to provide sufficient heat exchange to assure that the outer portion of the molten metal will be cooled sufficiently to freeze into the solid state, and preferably with the outer end of the electrode at a temperature of around 300° F. or less. When so formed, each electrode in the branch tube will consist in part of a molten portion A and a solid portion B, with a liquid-solid interface C at some point along the length of the branch tube, this point having been arbitrarily chosen in FIG. 3. Cooling fins 6 can be mounted on the outer portion of each branch tube (or of the electrode) to provide additional cooling and permit the branch tubes to be shorter. Alternatively, cooling water can be circulated around the outer portions of the same elements.

Instead of the self-electrodes formed by the molten metal stream in the manner described above, the electrodes may be formed by inserting in each branch tube, before molten metal is present in flow tube 1, a round bar of cold metal, preferably of the same composition as the molten metal in the flow tube. The bar should have an external diameter that will make a fairly close fit inside the branch tube. The inner end of the bar may extend into the interior of the flow tube, in which case the molten metal in flowing through the flow tube will melt the inner portion of each electrode bar to form an electrode that will again have a liquid inner portion and a solid outer portion meeting at a liquid-solid interface. Preferably, however, the inner end of the electrode bar does not initially extend as far as the inner surface of the flow tube 1, so that molten metal in that tube will enter and make contact with the solid bar electrode in bore 3 or branch tube 2. If the outer portion of the bar does not provide a leakproof fit in the branch tube, some of the melted portion of the bar (or of the metal stream from the flow tube) will flow into and plug any residual leakage paths between the electrode and the wall of the branch tube.

In most cases, this alternative method of forming the electrode will be preferable. Among other advantages, it tends to provide a more sharply defined liquid-solid interface. Also, the outer end of the electrode bar can be cored before inserting it into the branch tube to provide an internal channel for water cooling the electrode by conventional means. Another advantage is that it permits forming a composite electrode, in which the cold bar inserted in the branch tube may be, for example, stainless steel, the inner end of which is melted and in part replaced by the molten metal in the flow tube. Such use of stainless steel for the outer portion of the electrodes may, under certain circumstances, be desirable to minimize distortion of the adjacent electromagnetic field across the molten metal in the flow tube. In this region, the electrode should desirably be nonmagnetic but generally need not be at the cold end, which is usually far enough away from the flowmeter magnetic field not to affect it. Accordingly, even normally magnetic steels make suitable electrodes, because their temperature near the magnetic field is above the Curie point at which they become nonmagnetic. However, if the branch tubes and the electrodes are cooled sufficiently, then a normally magnetic steel electrode may be cold enough close to the flowmeter magnetic field to distort that field. In such case, if the electrode is a composite one with the cooler portion consisting of a normally nonmagnetic stainless steel, the distortion will be eliminated or minimal. Although such a composite electrode will generate some thermal electromotive force at the contacts between the different metals, such forces tend to be small because the contacting surfaces in the two electrodes are at substantially the same relative temperatures.

Regardless of what method is used to form the part-liquid, part-solid electrode, suitable electrical conductors are connected to the solid outer ends of the electrodes and led to conventional electronic equipment (not shown) for amplifying and measuring the electrical potential generated in the tube by an externally applied electrical field.

That field may be applied by a permanent magnet 11, provided with pole pieces 12 extending above and below flow tube 1 in the immediate vicinity of the branch tubes that contain the electrodes. The magnet assembly may be conveniently supported adjacent the flow tube in a frame 13 that is suspended by cables 14 attached to hangers 16 located above the center of gravity of the magnet assembly. If the molten metal in the flow tube is moving in the direction shown by the arrow in FIG. 2, and the magnetic flux passes vertically through that tube, then an electrical potential will be developed horizontally across the molten metal stream and will be conducted through the electrodes and conductors 17 to a panel board 18 and then to the measuring apparatus (not shown).

It will be apparent that this invention provides an electrode that penetrates the wall of an electrically non-conconductive tube to make effective electrical contact with a stream of molten metal flowing in the tube, that possesses self-sealing features preventing the escape of molten liquid, that accommodates itself to a decrease in the thickness of the flow tube wall caused by the erosion of the molten metal flowing therein, and that is simple to construct and reliable to use.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with an electrically non-conductive flow tube for a stream of molten metal, of means comprising a branch tube of electrically non-conductive material communicating with and extending outwardly from the interior of the flow tube, and a metal electrode disposed in the branch tube with the portion adjacent the flow tube being in the molten state and in electrical contact with the stream of molten metal in the flow tube and with its extended portion remote from the flow tube being in the solid state.

2. The combination of claim 1, in which the branch tube slopes upwardly to its junction with the flow tube to prevent gases from accumulating in the branch tube.

3. The combination of claim 1, in which the solid portion of the electrode comprises a solidified portion of the stream of molten metal flowing in the flow tube.

4. The combination of claim 1, in which the extended portion of the electrode comprises a solid metal rod disposed inside the branch tube remote from the flow tube.

5. The combination of claim 1 and means for cooling the portion of the electrode remote from the flow tube.

6. In an apparatus for measuring the flow of a stream of molten metal, the combination comprising a flow tube of electrically non-conductive material through which the stream flows, means disposed exteriorly of the flow tube for creating a magnetic field across the predetermined section of the tube and transverse of the line of flow of the stream, a pair of electrically non-conductive electrode tubes communicating with the interior of the flow tube on and extending outwardly from it on opposite sides thereof providing a voltage measuring path therebetween transverse of the line of flow and the field, a metal electrode disposed in each electrode tube for making electrical contact with the stream, the portion of each electrode adjacent the flow tube being in the molten state and the portion remote therefrom being in the solid state.

7. Apparatus according to claim 6, in which each electrode tube slopes upwardly towards the flow tube to prevent gases from collecting in the electrode tubes.

8. Apparatus according to claim 6, in which the solid portion of each electrode is formed by a portion of the stream of molten metal that flows from the flow tube into the branch tube and there solidifies.

9. Apparatus according to claim 6, in which part of each electrode is formed from a solid rod disposed inside the branch tubes before the molten metal begins to flow through the flow tube, and in which the molten part of each electrode is molten metal flowing from the flow tube into said branch tube.

10. Apparatus according to claim 9, in which the inserted solid rod has a different composition from that of the molten metal in the flow tube.

References Cited

UNITED STATES PATENTS

| 3,421,989 | 1/1969 | Haagen-Smit | 204—195 |
| 3,355,604 | 11/1967 | Klein | 310—11 |
| 2,896,451 | 7/1959 | Rinia | 73—194 |

RICHARD C. QUEISSER, Primary Examiner

J. WHALEN, Assistant Examiner

U.S. Cl. X.R.

310—11